(12) United States Patent
Fung et al.

(10) Patent No.: US 8,732,639 B1
(45) Date of Patent: May 20, 2014

(54) METHOD AND APPARATUS FOR PROTECTING, OPTIMIZING, AND REPORTING SYNCHRONIZERS

(75) Inventors: Ryan Fung, Mississauga (CA); Vaughn Betz, Toronto (CA); David Neto, Toronto (CA)

(73) Assignee: Altera Corporation, San Jose, CA (US)

( * ) Notice: Subject to any disclaimer, the term of this patent is extended or adjusted under 35 U.S.C. 154(b) by 521 days.

(21) Appl. No.: 12/384,377

(22) Filed: Apr. 3, 2009

(51) Int. Cl.
*G06F 9/455* (2006.01)
*G06F 17/50* (2006.01)

(52) U.S. Cl.
USPC ............ 716/108; 716/106; 716/134; 716/136

(58) Field of Classification Search
USPC ................................................ 716/108, 134
See application file for complete search history.

(56) References Cited

U.S. PATENT DOCUMENTS

| | | | |
|---|---|---|---|
| 6,462,595 B1 * | 10/2002 | Hsu et al. ....................... | 327/215 |
| 2004/0066870 A1 * | 4/2004 | Gabara et al. ................. | 375/354 |
| 2005/0273735 A1 * | 12/2005 | Dargelas .......................... | 716/4 |
| 2005/0273741 A1 * | 12/2005 | Lahner et al. .................... | 716/6 |

OTHER PUBLICATIONS

Yang, Suwen; Greenstreet, Mark; "Computing Synchronizer Failure Probabilities," May 20, 2007, Date '07, IEEE.*
Davis, Tim, "Managing Synchronizer MTBF," Feb. 25, 2009, Aspen Logic Journal.*
Dobkin, Rostislav; Ginosar, Ran; "Zero latency synchronizers using four and two phase protocols," Oct. 2007, <http://webee.technion.ac.il/~ran/papers/zerolatency.pdf>.*
Ginosar, Ran, "MTBF of a Multi-Synchronizer System on Chip," Jun. 6, 2005, <http://webee.technion.ac.il/~ran/papers/MTBFmultiSyncSoc.pdf>.*

* cited by examiner

*Primary Examiner* — Vuthe Siek
*Assistant Examiner* — Eric Lee
(74) *Attorney, Agent, or Firm* — L. Cho

(57) ABSTRACT

A method for designing a system on a target device using an electronic design automation (EDA) tool including identifying synchronizer chains in a system design using timing relationships. According to one embodiment of the present invention, the method includes conveniently reporting system reliability considering synchronization, and automatically protecting and optimizing synchronizer chains to improve system robustness.

37 Claims, 13 Drawing Sheets

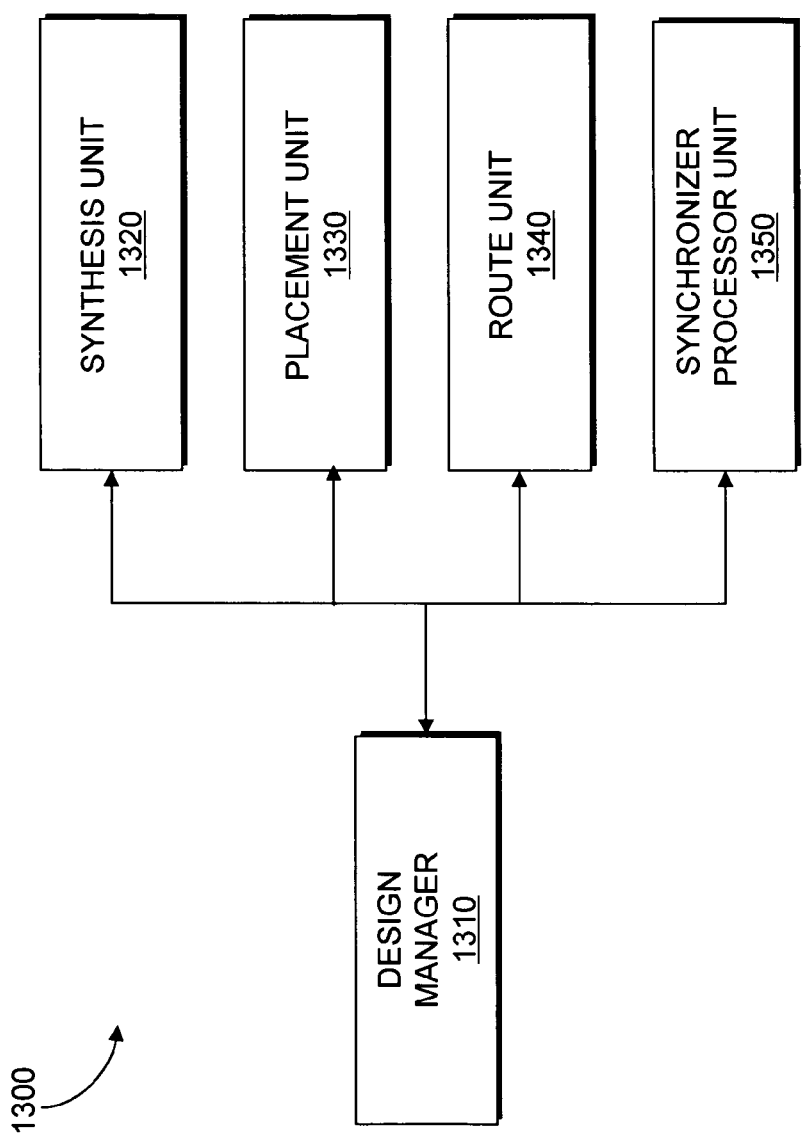

METHOD AND APPARATUS FOR PROTECTING, OPTIMIZING, AND REPORTING SYNCHRONIZERS

TECHNICAL FIELD

The present invention relates to electronic design automation tools for designing systems on target devices. More specifically, the present invention relates to a method and apparatus for protecting, optimizing, and reporting synchronizers in a design flow.

BACKGROUND

Modern logic designs often employ multiple clock domains to support high-speed communication where synchronous transfers using a single board clock would not be practical. One example of this application can be seen in source synchronous communication where a clock or strobe is sent along with the data. Another example relates to recovered clocks where the information needed to re-construct the clock is embedded in the data stream.

Having a number of isolated clock domains is generally not useful in a logic design. Data needs to flow between the clock domains. In order to transfer data between clocks that are asynchronous to one another, synchronizers are needed to synchronize asynchronous data to a given clock. For every clock cycle, a synchronizer makes a decision whether a given signal is a 0 or 1.

FIG. 1 illustrates an exemplary synchronizer 100. The synchronizer 100 includes 3 registers connected in series. The series of registers is used because each register has a certain probability of going metastable. A register experiences metastability when data changes when the register is sampling and the register goes into an intermediate state. The register will eventually decide whether it should output a 0 or a 1, but the length of time it takes to decide is a super-linear function of how close the data arrives to the clock. If the time it takes to make a decision is so long that the next register in the chain cannot sample a clean signal, that subsequent register can also go metastable. If this indecision makes it through the synchronizer chain, the logic circuit may start to fail by behaving incorrectly. Different parts of the design could interpret the signal differently.

The mean-time-between-failure (MTBF) where all the stages of a synchronizer chain fail to decide in time is a parameter given to assess the quality of a synchronizer. The MTBF can be computed with the following relationship.

$$\text{MTBF} = [e^{[(\text{chain slack})/c2]}]/(fclk*fdata*c1)$$

In this relationship, fclk is the frequency of the sampling clock, fdata is the incoming data rate, c1 is the window of the time around a clock edge where a data transition will cause metastability, and c2 is the time constant of resolution. Chain slack is the total slack of all the hops of the chain and it is the amount of time the chain has to resolve metastability. The more time (slack) available, the larger the MTBF will be. Also, the smaller the time constant of resolution, the larger the MTBF will be.

Synchronization is also important for sampling the physical world. Synchronizing the physical world is typically less prone to failure because the data rates are generally much smaller than in high-speed communication, and the MTBF is inversely proportional to data rate.

In the past, designers would build synchronizers of a pre-determined length that statistically seemed reasonable enough to guarantee good system MTBFs regardless of the synthesis, placement, and routing of the synchronizer. The designers would also often be required to explicitly mark these registers to prevent them from being re-timed or duplicated. The designers also had to manually inspect the final implementation of the synchronizers.

SUMMARY

According to an embodiment of the present invention, timing relationships are used to accurately determine asynchronous transfers and to identify the chains of storage elements used to synchronize them. A framework is given for automatically and conveniently reporting system reliability. Techniques for protecting and optimizing synchronizer chains are also disclosed that can be incorporated into existing synthesis, placement, and routing procedures. These techniques enable improvement in system reliability with minimum impact on other quality metrics.

BRIEF DESCRIPTION OF THE DRAWINGS

The features and advantages of the present invention are illustrated by way of example and are by no means intended to limit the scope of the present invention to the particular embodiments shown.

FIG. 13 illustrates a system designer according to an embodiment of the present invention.

DETAILED DESCRIPTION

In the following description, for purposes of explanation, specific nomenclature is set forth to provide a thorough understanding of embodiments of the present invention. However, it will be apparent to one skilled in the art that specific details in the description may not be required to practice the embodiments of the present invention. In other instances, well-known components, programs, and procedures are shown in block diagram form to avoid obscuring embodiments of the present invention unnecessarily.

Figure 2:
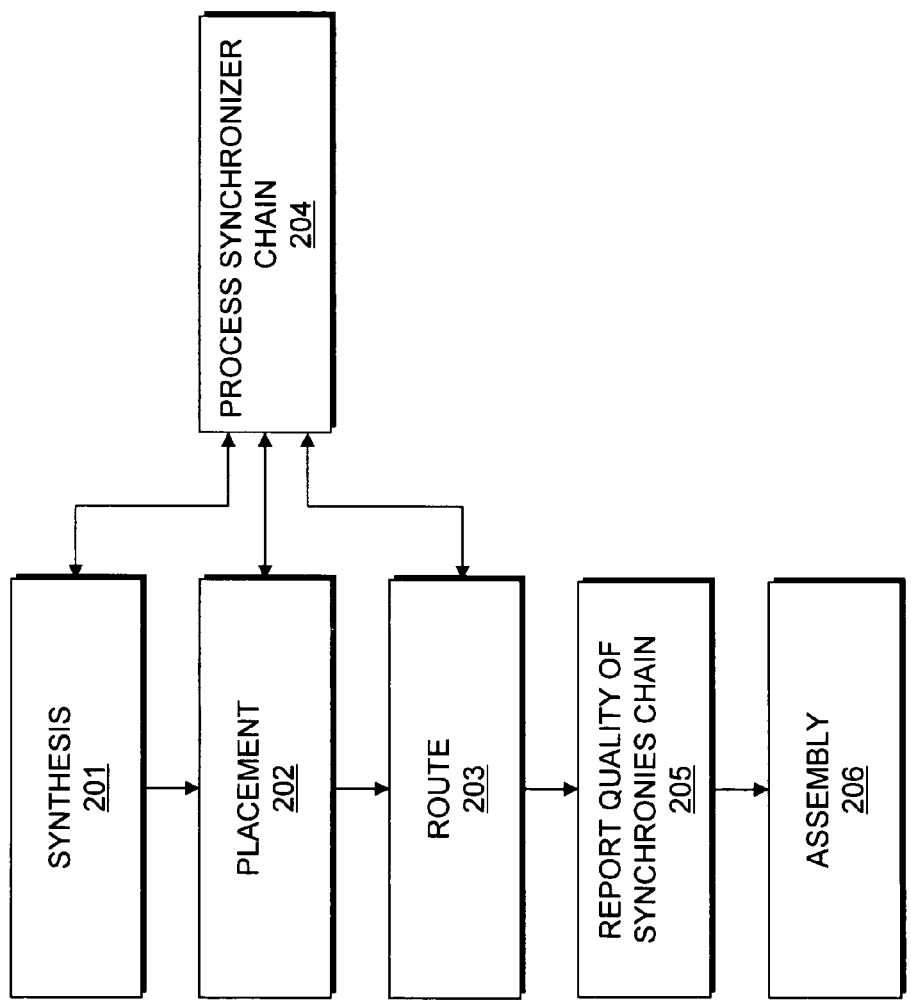
FIG. 2 is a flow chart illustrating a method for designing a system on a target device according to an embodiment of the present invention.

FIG. 2 is a flow chart illustrating a method for designing a system on a target device according to an embodiment of the present invention. The target device may be an FPGA, ASIC, a structured ASIC, or other device. According to an embodiment of the present invention, the methodology described with reference to FIG. 2 may be performed by an EDA tool. Each of the procedures in FIG. 2 may be performed automatically by the EDA tool without user intervention. At 201, the system is synthesized. Synthesis includes generating a logic design of the system to be implemented by a target device. According to an embodiment of the present invention, synthesis generates an optimized logical representation of the system from an HDL design definition. Synthesis also includes mapping the optimized logic design. Mapping includes determining how to implement logic gates and logic elements in the optimized logic representation with specific resources on the target device. According to an embodiment of the present invention, a netlist is generated from mapping. This netlist may be an optimized technology-mapped netlist generated from the HDL.

At 202, the system is placed. According to an embodiment of the present invention, placement involves placing the mapped logical system design on the target device. Placement works on the optimized technology-mapped netlist to produce a placement for each of the functional blocks. According to an embodiment of the present invention, placement includes fitting the system on the target device by determining which resources on the target device are to be used for specific logic gates and logic elements in each functional block.

At 203, it is determined which routing resources should be used to connect the components in the target device implementing the functional blocks in the system. During routing, routing resources on the target device are allocated to provide interconnections between logic gates, logic elements, and other components on the target device.

At 204, a procedure for processing synchronizers in the system design is performed which identifies, protects, and optimizes the synchronizers. Processing the synchronizers may be performed in whole or in part before the synthesis, placement, and/or routing procedures (201-203) as shown, or during or after the procedures. According to an embodiment of the present invention, after synchronizer chains are identified, the procedure may utilize procedures within synthesis, placement, and/or routing to protect and/or optimize the synchronizer chains as will be further described.

At 205, the quality of the synchronizers is reported to a user (designer). According to an embodiment of the present invention, a timing report may be generated and output to the user. The timing report would include information such as a design MTBF, the MTBF for each synchronizer chain, and other information that may be used by the user to assess or further improve the system design.

Figure 1:
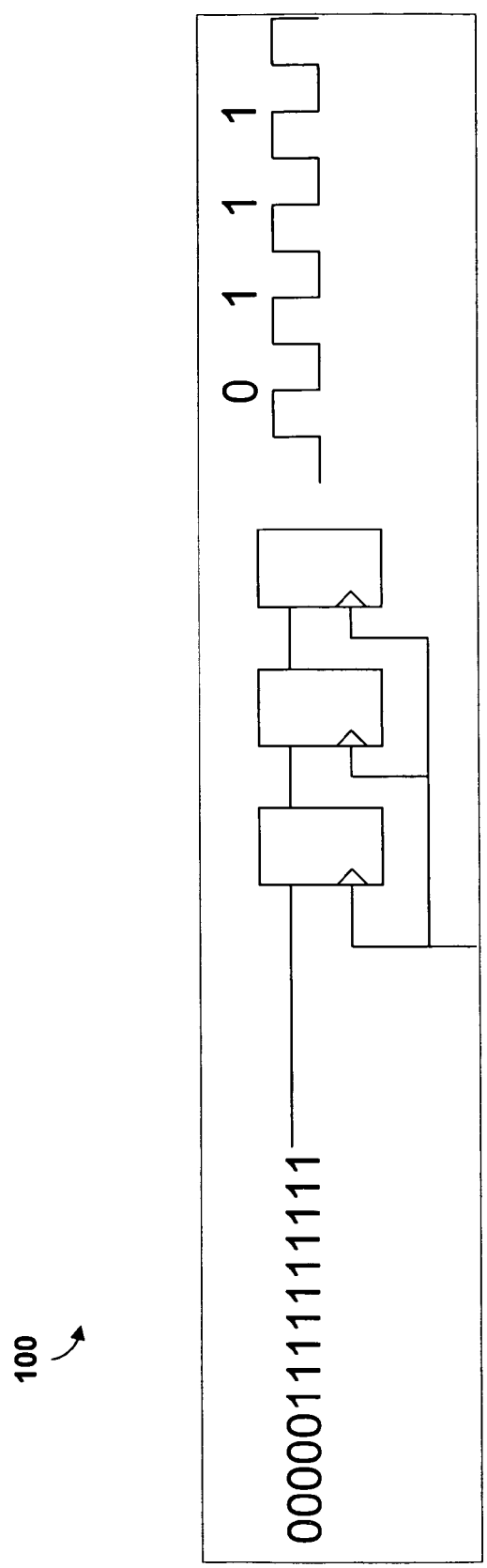
FIG. 1 illustrates an example of a synchronizer.

At 206, an assembly procedure is performed. The assembly procedure involves creating a data file that includes some of the information determined by the procedure described by 201-204. The data file may be a bit stream that may be used to program the target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium.

Figure 3:
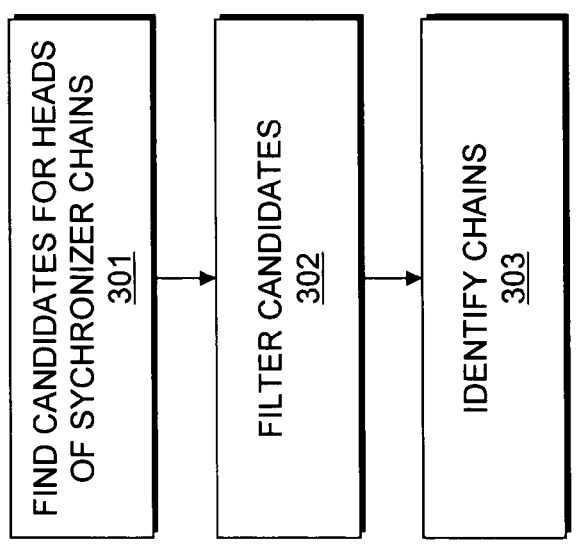
FIG. 3 is a flow chart illustrating a method for identifying synchronizer chains according to an embodiment of the present invention.

FIG. 3 is a flow chart illustrating a method for identifying synchronizer chains according to an embodiment of the present invention. The procedure in FIG. 3 may be performed at 204 in FIG. 2. At 301, candidates for the heads of synchronizer chains are found. To find synchronizer chains, asynchronous transfers are identified. The destinations of asynchronous paths are determined to be the heads of the synchronizer chains. To identify asynchronous paths, traversals can be performed starting at primary inputs and storage nodes, propagating forward information on source clocks. When a destination is reached, the destination storage node needs to be synchronous with respect to all the source clocks or the destination might receive asynchronous data. According to an embodiment of the present invention, when sources such as primary inputs are not associated with a clock, an assumption is made that all paths from the source are asynchronous with respect to destination. Hence, all destinations must act as synchronizers. If it is believed that designer omission or error is the reason why certain inputs may not be properly constrained, these inputs may be ignored.

Clock relationships are necessary but not sufficient to guarantee a synchronous transfer. Some synchronous transfers will be cut with false paths. In those cases, any timing exceptions need to factor into the asynchronous identification. If a timing path is cut, the destination must be asynchronous. According to an embodiment of the present invention, it is assumed that large multi-cycle constraints are indicative of an effective cut path and not indicative of a correct timing relationship. Similarly, point-to-point delay assignments that result in timing relationships inconsistent with those implied by the clock relationships may make a synchronous path asynchronous because there is no longer a guarantee the data will be stable when the destination samples the signal. Potential synchronizer chain heads may also be identified based on these exceptions.

At 302, identified synchronizer head candidates are filtered. A set of criteria may be used to dictate how the filtering is performed. Data transfers between unrelated clocks arbitrated by data-ready signaling can be a common situation where synchronizer chain heads may be incorrectly identified. In this scenario, the general topology includes a plurality of asynchronous paths corresponding to various data bits. A data-ready protocol guarantees that the data bits will only be interpreted when they are stable to ensure reliable sampling of the asynchronous signals. The data-ready circuitry needs to guarantee enough latency to give the data bits a chance to stabilize. By looking for this topology and verifying this latency, false synchronizer chain heads can be removed. According to an embodiment of the present invention, potential synchronizer chain heads that are fed by enable signals or that feed downstream logic that are controlled by enable signals are examined. If the enable signals are generated from logic that is a function of other synchronizer chains (state signals), the structure of the synchronizer chain is likely of the topology described.

According to an embodiment of the present invention, the data-bit synchronizer chain heads are discarded at this point. According to an alternate embodiment of the present invention, additional checking may be performed. The additional checking may involve comparing the latency of the state signals to the latency of the data bits to ensure that the state signals only change after the data bits stabilize. Formal verification or simulation-based techniques can be used to verify that the state circuitry behaves as necessary to ensure the data bit captures are reliable. It should be appreciated that synchronizer chain heads determined to have a chain length of 1 may be discarded. These are likely not designer-intended synchronizer chains because they are likely to be highly unreliable and imply that some data-ready of handshaking protocol is used to successfully manage the data transfer.

Figure 4:
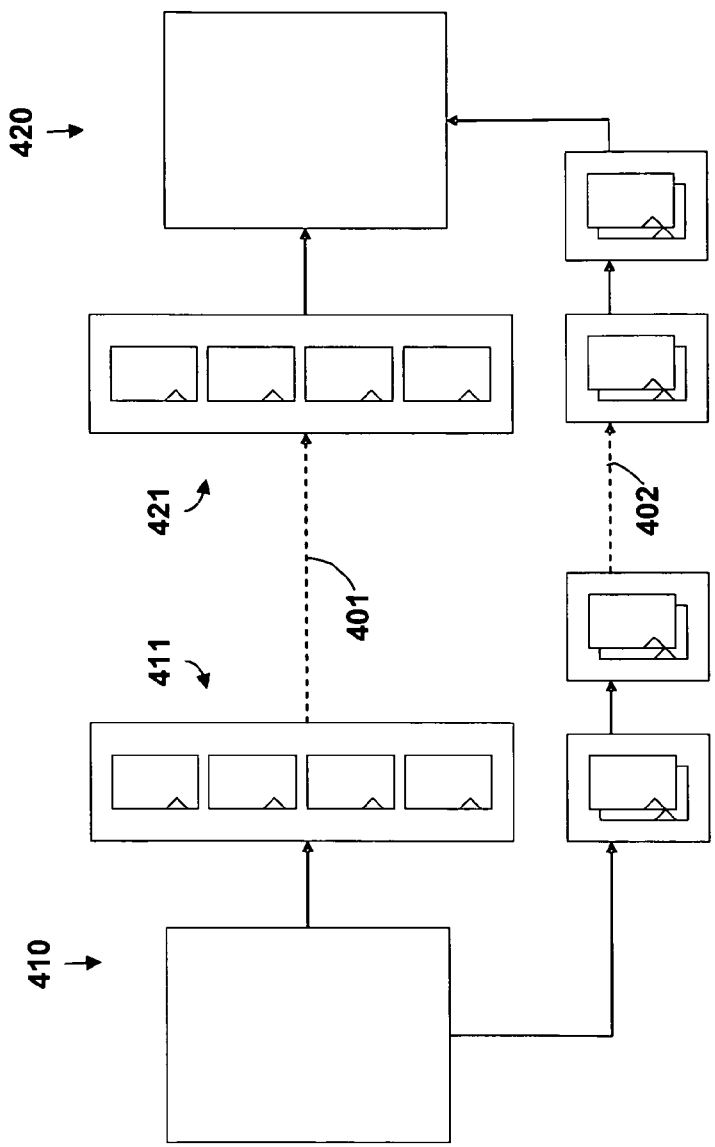
FIG. 4 illustrates logic topology that supports data-ready signaling according to an embodiment of the present invention.

FIG. 4 illustrates logic topology that supports data-ready signaling according to an embodiment of the present invention. In this example, a single bit of data is transmitted from a first domain on the left 410 to a second domain on the right 420 on data path 401. The data to be transmitted is written into one of the registers in the first bank 411. Which register is used is a function of state maintained by the first domain 410. The state is transferred to the second domain via a control path 402 through several cycles of latency. This latency should be sufficient to give the data bit enough time to travel so it can be reliably captured by the corresponding register in the second bank 421. The second domain 420 can then read the stable data out of the second bank 421 when it is ready without metastability being a concern. Consequently, the second bank registers do not act as synchronizers when the system is operating.

Given that the synchronizer chain head identification is heuristic, ultimate control over which synchronizers are identified should be left to the designer. The designer is free to override the automatically identification mechanism to indicate that a storage element is or is not the head of a synchronizer chain. The designer may wish to separately control whether synchronizer chains are protected, optimized, and reported. For example, it may be important to protect the heads of potential synchronizer chains to help ensure design assumptions are satisfied. These assumptions may include, for example, where the boundaries of clock transfers occur and the amount of latency. It may also be acceptable to ignore those chains during reporting because given that the design assumptions are met, those potential synchronizer chains will not go metastable during system operation.

Referring back to FIG. 3, at 303 chains for synchronizer heads are identified. According to an embodiment of the present invention, this is achieved by traversing through logic driven by each synchronizer chain head for storage elements. If only one storage element is found downstream of the synchronizer chain head and all paths between the two are synchronous transfers, then the identified storage element will be the next element of chain. This procedure can be continued to find other elements of the synchronizer chain. The process terminates when a synchronizer chain element is found that feeds directly or indirectly more than one storage element. Once multiple downstream storage elements are found, a unique decision needs to be made at the last synchronizer chain element about the asynchronous event in order to avoid functional failures in the system.

Figure 5:
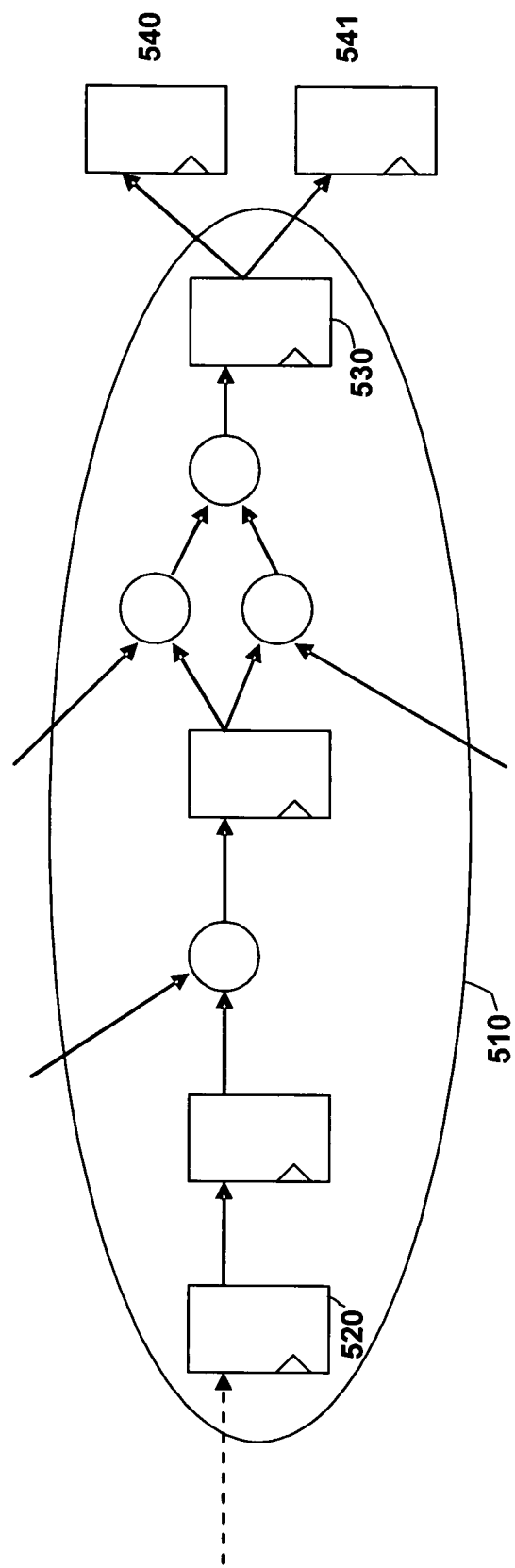
FIG. 5 illustrates an example of identifying a synchronizer chain according to an embodiment of the present invention.

FIG. 5 illustrates an example of identifying a synchronizer chain according to an embodiment of the present invention. In this example, a synchronizer chain 510 is identified starting from a head element 520 on the left. The chain identification continues until multiple downstream elements are found. The end of the chain 530 feeds (directly or indirectly) multiple storage elements 540 and 541. For correct operation, the chain should present a unique decision about the state of the asynchronous signal to those multiple storage elements.

According to an embodiment of the present invention, a designer may specify the length of each chain. The designer may be given a limit which prevents specifying a chain length longer than what is considered reasonable by an identification code. Separate control may be offered over the length of the chain with regard to protection, optimization, and reporting. For example, it may be desirable to only protect and optimize up to a certain length to permit the remaining synchronizer chain elements to be leveraged for other optimization purposes. It should be appreciated that it may still be beneficial for reporting to consider a full chain after optimization to avoid calculating an overly conservative MTBF.

Figure 6:
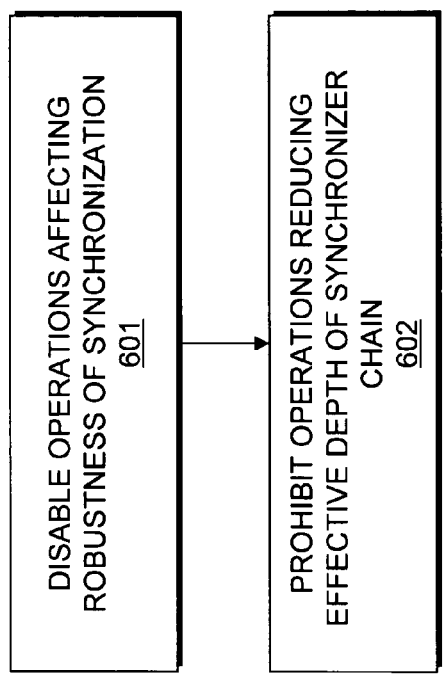
FIG. 6 is a flow chart illustrating a method for protecting a synchronizer chain according to an embodiment of the present invention.

FIG. 6 is a flow chart illustrating a method for protecting a synchronizer chain according to an embodiment of the present invention. The procedure in FIG. 6 may be performed at 204 in FIG. 2. Protection of the synchronizer chain may be performed after identifying the synchronizer chain as described by the procedure in FIG. 3. At 601, operations which can affect the robustness of synchronization are disabled. These operations may include those which may re-time the source of a signal being synchronized across levels of logic. This can result in a glitch-prone signal which is unfavorable for synchronization. The synchronizing clock domain cannot distinguish signal values which are intended for sampling and which are intermediate states.

At 602, operations which reduce the effective depth of the synchronizer chain are prohibited. According to an embodiment of the present invention, any operation which can duplicate a stage of the synchronizer chain will effectively shorten the chain. Each stage of the chain needs to make a single decision as to the state of its input. If a stage of the chain is duplicated, the chain is effectively shortened because that stage and all subsequent stages may make different (inconsistent) decisions about the input signal. If a first stage of a chain is duplicated, then that chain is effectively destroyed. No attempt is made to uniquely sample the signal.

As described with reference to FIG. 3, candidate synchronizer chain heads may be filtered or eliminated when the rest of the system is designed to ensure the respective data is stable when sampled. It should be appreciated that it may still be advantageous to protect the respective storage elements and the source of the signals feeding them. Designers may not fully constrain asynchronous transfers and design for correct operation by assuming the latency of a reasonable design implementation. If synthesis is allowed to re-time storage elements to optimize other paths, these latency assumptions may be violated.

With respect to 602, operations may be permitted if a chain length needed for good MTBF is shorter than the identified or user-specified chain length. This determination of the necessary chain length can be made before all operations or before each operation. The MTBF of a synchronizer chain may be computed based on actual or estimated placement and routing. The MTBF can be computed assuming the chain has N-k stages where k is $>=0$ and N is a number of stages in the identified chain. The largest k can be selected for which the MTBF of the chain is reasonable. That result can be used to permit operations that effectively shorten the chain up to the specified length. The reasonableness of the MTBF for a chain may be based on a single minimum MTBF value, or it can be a function of the device, the total number of anticipated synchronizers, and a user specified or recommended MTBF target. It may also be a function of the actual number of synchronizers in a current design and/or the MTBF estimates of those synchronizers. This may not be beneficial when the current design is only a portion of a larger system. In practice, since MTBF is exponentially dependent on chain slack, removing a stage of the chain usually has a dramatic effect on MTBF. Thus, fine tuning may not be a concern.

Figure 7:
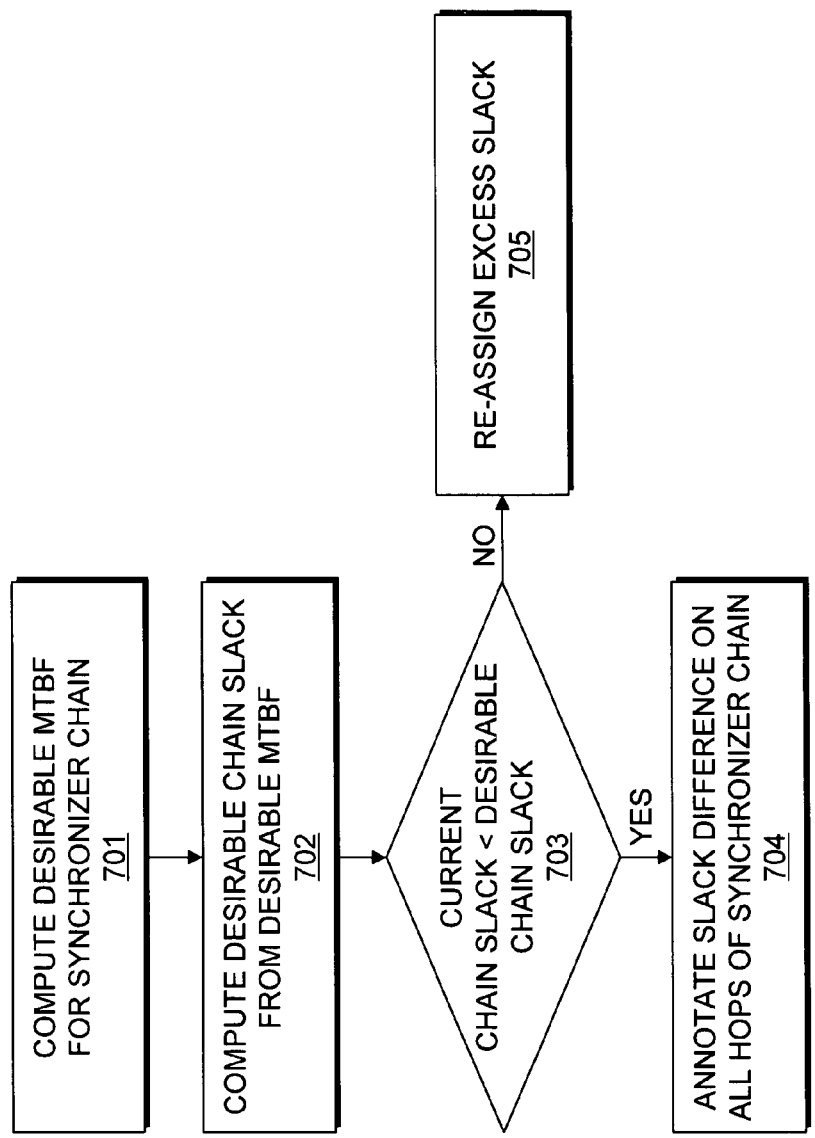
FIG. 7 is a flow chart illustrating a method for optimizing a synchronizer chain according to an embodiment of the present invention.

FIG. 7 is a flow chart illustrating a method for optimizing a synchronizer chain according to an embodiment of the present invention. The procedure in FIG. 7 may be performed at 204 in FIG. 2. At 701, a desirable MTBF for a synchronizer chain is identified. According to an embodiment of the present invention, a desirable MTBF for a system may be a user-specified value or a value that an EDA tool attempts to achieve. The desirable MTBF for a chain may be determined from the desirable MTBF for the system. The same techniques described above can be applied when computing a desirable MTBF for this method.

At 702, a desirable chain slack for the synchronizer chain is computed from the desirable MTBF.

At 703, it is determined whether the current (actual) chain slack for the synchronizer chain is less than the desirable chain slack. If the current chain slack for the synchronizer chain is less than the desirable chain slack, control proceeds to 704. If the current chain slack for the synchronizer chain is greater than the desirable chain slack, control proceeds to 705. Many optimization algorithms in placement and routing procedures use slacks for timing analysis to guide optimization. Consequently, if slacks can be computed for the connections or paths between synchronization registers, existing placement and routing optimization techniques can be seamlessly leveraged to perform necessary optimization.

At 704, slack is annotated on all the hops of the synchronizer chain. The amount of slack annotated may be the actual chain slack minus the desired chain slack. This will encourage all the hops of the chain to improve their timing to achieve the desired chain slack.

At 705, the excess slack is mapped to the hops of the chain. According to an embodiment of the present invention, the excess slack is directly annotated on the hops of the chain. According to an alternate embodiment of the present invention, the excess slack is divided among the various hops of the synchronizer chain rather than directly annotated on the various hops. If the excess slack were simply annotated on all the various hops, each of the various hops might de-optimize according to the excess slack in order to satisfy other optimization objectives. The resulting chain slack may end up exceeding the desired chain slack. It should be appreciated that these chain slacks are different from regular slacks in that they are computed across several register-to-register hops rather than from register-to-register. By dividing up the slack and allocating it to the various hops, the slacks for synchronizer chain optimization will best resemble the slacks computed for regular timing constraints. It should be appreciated that this division of slack can also be done in 704 to reduce the likelihood of over-optimizing.

According to an embodiment of the present invention, requirements such as required times may be used to normalize slack values. The required time for a synchronizer chain may be back-computed based on current delays of the chain hops and excess chain slack, or the sum of the register-to-register delay requirements and the desired chain slack. Required times may be computed for all of the hops of a synchronizer chain considered together, and/or for each hop of the synchronizer chain independently.

With reference to procedures 704 and 705, most optimization algorithms given chain slack values should optimize a design for a system to achieve the desired reliability. It should be appreciated that some specific algorithms can also be crafted to supplement this generic approach. For example, some device architecture may support specialized routing paths between registers and it may be beneficial to specifically constrain these inter-register hops to use these resources. It may also be beneficial to constrain the registers in a chain to the same logic-array block which supports relatively fast local routing. Some optimization may be directed at improving the time constants of synchronization registers. For example, some FPGA architectures support back-bias features that tradeoff timing performance for power. The back-bias setting can greatly affect the metastability time constants, so some procedures may want to ensure that all synchronizers get favorable back-bias settings explicitly, or as needed based on desired MTBF performance.

Figure 8:
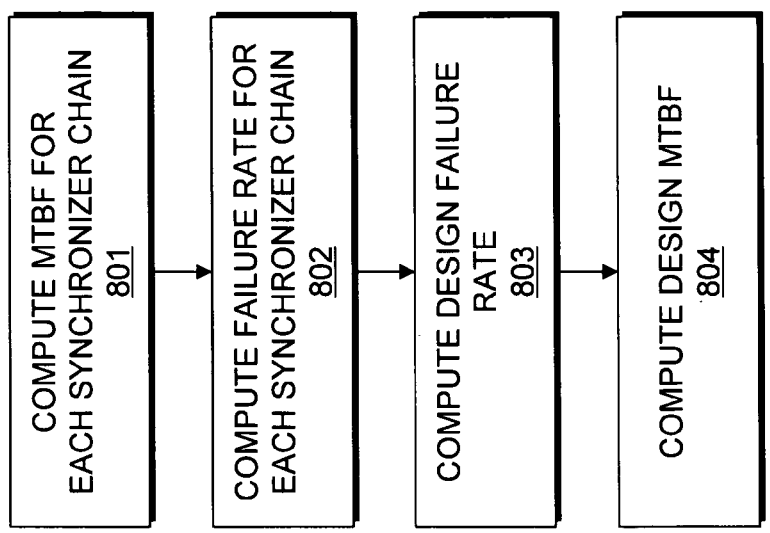
FIG. 8 is a flow chart illustrating a method for computing reporting data according to an embodiment of the present invention.

FIG. 8 is a flow chart illustrating a method for computing reporting data according to an embodiment of the present invention. The procedure in FIG. 8 may be performed at 205 in FIG. 2. Based on identified synchronizer chains, asynchronous transfer MTBF may be used as a metric of system reliability. At 801, the MTBF for each synchronizer chain in a system design is computed. According to an embodiment of the present invention, for each synchronizer chain, the minimum slack at each of the chain element outputs, the metastability time constant for each chain element, the frequency of the asynchronous data, and the frequency of the sampling clock are used to compute the MTBF.

It should be appreciated that depending on the various storage element types, the time constant for resolution (metastability time constant), c2, for each chain element may differ. For example, the master and slave latches of register storage elements may have different time constants. Consequently, it may be important to consider the master and slave latches separately during MTBF computation. A separate allocation of slack between the mater and slave latches of a register may be made if a register-centric timing analysis is performed.

According to an embodiment of the present invention, a master and slave latch allocation can be achieved by examining when the falling edge of a clock arrives at positive-edge-triggered registers. When the falling edge arrives, the slave latch will latch the data and the master latch will become transparent. Before this point, the master latch time constant will be relevant, and after that point, the slave latch time constant will be relevant. Therefore, up until the falling edge, the master will use up slack trying to resolve metastability. After the falling edge, the slave will use up slack. It should be noted that if the register slack is small enough, the master may be entirely relied upon to resolve. The slave may never get a chance to resolve because by the time the falling edge arrives, the relevant data will be already on its way to subsequent register(s). Based on this, the effective slack of each latch can be computed as a function of register slacks and clock duty cycles. According to one embodiment, clock arrival uncertainty and/or jitter can be used when determining an appropriate amount of slack to assign to each storage element. This may be done conservatively based on an early arrival of the clock with respect to the path feeding the storage element and a late arrival of the clock with respect to the path fed by the storage element. This matches what is done during normal slack computation. However, this is pessimistic for MTBF computation because the clock will arrive at a distinct point in time for any given sampling event, so for the purposes of MTBF computation, this missing slack can be conservatively assigned to the storage element with the worse time constant.

It should be appreciated that if c2 of various registers or latch storage element differ, the exponent can be changed to the sum of the component chain-slack-to-time-constant ratios:

$$(\text{chain slack})_1/c2_1 + (\text{chain slack})_2/c2_2 + (\text{chain slack})_n/c2_n$$

To compute the frequency of the asynchronous data, a constant fraction of the source clock frequency can be assumed. For example, it can be assumed that the data toggles every other positive edge of the clock. The frequency of the data can also be obtained from simulation data and/or it can be entered by the designer, globally, or for each chain independently. In some cases, the frequency of the data can be inferred from the type of signal based on the name, the source of the signal, or the port fed by the signal. For example, toggle rates of asynchronous clear signals can be assumed to be lower.

At 802, the failure rate for each of the synchronizer chains is computed. According to an embodiment of the present invention, the failure rate for each synchronizer chain may be determined as the reciprocal of the synchronizer chain's MTBF.

At 803, the design failure rate is computed. According to an embodiment of the present invention, the design failure rate is computed as the sum of the failure rates of all the synchronizer chains in the design.

At 804, the design MTBF is determined from the design failure rate. According to an embodiment of the present invention, the design MTBF may be determined to be the reciprocal of the design failure rate computed at 803.

A timing report may be generated that indicates a design MTBF and the MTBF of each of the synchronizer chains in a system design. For each of the chains, the node feeding the head of the synchronizer chain and the head of the synchronizer chain can be identified along with the respective clocks involved in the asynchronous transfer. Detailed slack information and the respective time constants can be provided for each element of each synchronizer chain to give a designer information about where improvements are needed. According to an embodiment of the present invention, time constants may be re-interpreted and presented in the form of a multiplier on MTBF for a fixed amount of slack. A recommended number of registers can also be computed to achieve a reasonable MTBF for each synchronizer chain. A fixed delay between the register may be assumed or a delay equal to one of the current chain hops may be assumed.

According to an embodiment of the present invention, the failure rates of synchronizer chains can be further analyzed or refined by considering how the logic within the chain and after the chain acts to filter potentially metastable inputs. To perform this analysis, it should be realized that given a bus of synchronized signals, only one signal need be assumed to go metastable in any given clock cycle. Disciplined designers must use some form of gray code or other encoding scheme that guarantees single transitions per state change to allow for the buses to be reliably sampled. Given this assumption, for each synchronizer chain, an analysis can be performed for each logic cone output that is a function of the synchronizer chain output. This analysis may assume that all the other signals feeding the logic code are stable and/or meeting timing. With this assumption, the probability that the output is sensitive to the potentially metastable signal can be determined. Only cases where the output is sensitive to the potentially metastable signal will a metastable event corrupt the system. This filtering can occur within the synchronizer chain, if it contains logic, as well as after the synchronizer chain. A larger MTBF may be computed based on this analysis.

Figure 9:
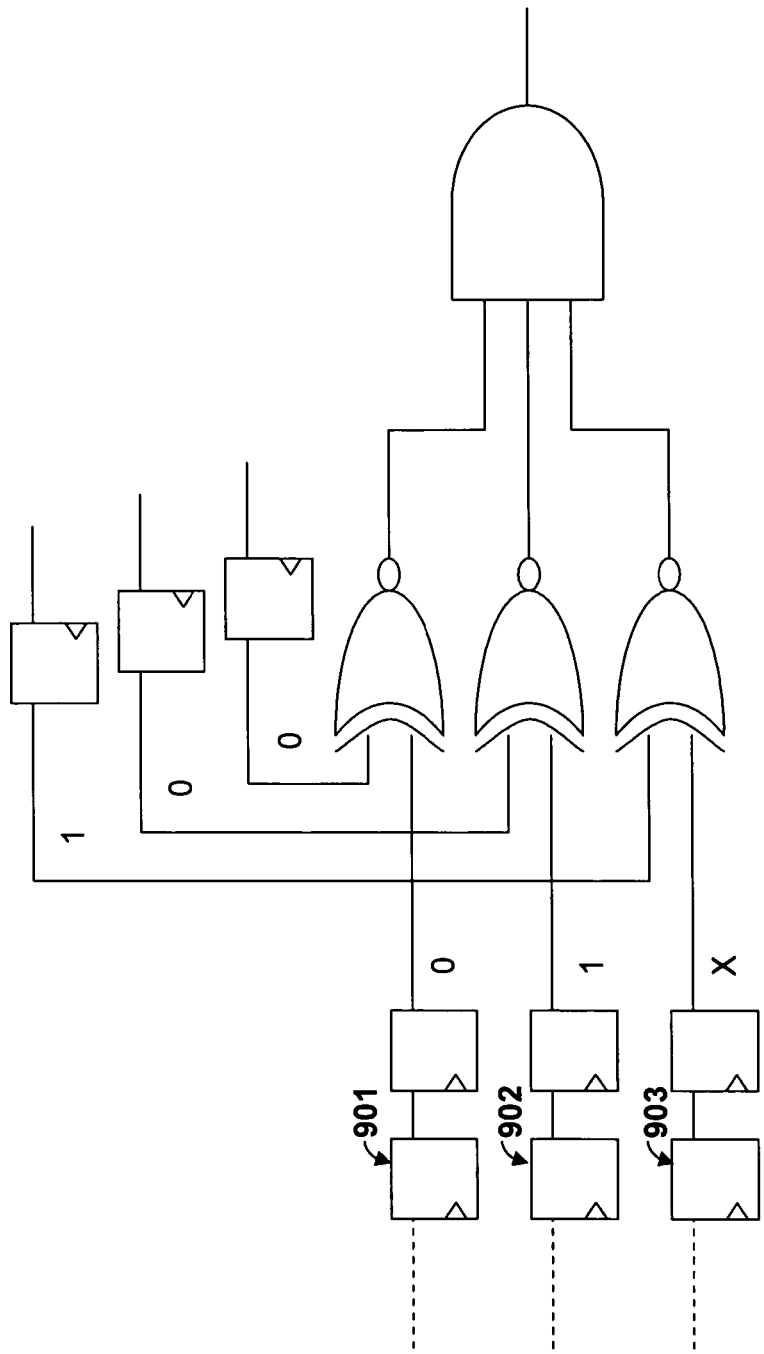
FIG. 9 illustrates an example of using outputs of a set of synchronizer chains to compute a function according to an embodiment of the present invention.

FIG. 9 illustrates an example of using outputs of a set of synchronizer chains 901-903 to compute a function. For the analysis of synchronizer chain 903, it can be assumed that synchronizer chains 901 and 902 are outputting stable data guaranteed by the bus encoding scheme described above. All other logic cone inputs are synchronous to this clock domain. One possible state of input values is illustrated in FIG. 9. For a combination of input values, the output is not sensitive to the potentially metastable input. Based on the probability of this input state occurring, along with the probability of other input states, the overall probability that a metastable signal will cause a system failure can be computed. The probability of various input states occurring can be determined analytically, it can be determined using simulation methods, or the user may specify the probability of the input states.

The data rate of the input of synchronizer chains may be adjusted to account for filtering that occurs inside or after the synchronizer chains. According to one embodiment, if filtering occurs over several clock cycles, correlations in the input states may need to be considered. Some filtering may also reveal that some chains (under certain logic-cone input combinations) are actually longer than anticipated because only one destination is sensitive to the chain output, rather than multiple destinations.

According to an embodiment of the present invention, respective logic cones may be checked to determine if they are glitch free. A logic cone is glitch free when it does not glitch regardless of when a potentially metastable input changes when all other inputs are stable and satisfy their timing requirement. Logic cones are typically glitch free when they are convergent tree-like structures such as a LUT-like structure built from a plurality of multiplexers, where each input feeds a successive multiplexer stage. It should be appreciated that embodiments of the present invention may synthesize logic in this form to make it glitch-free.

Figure 10:
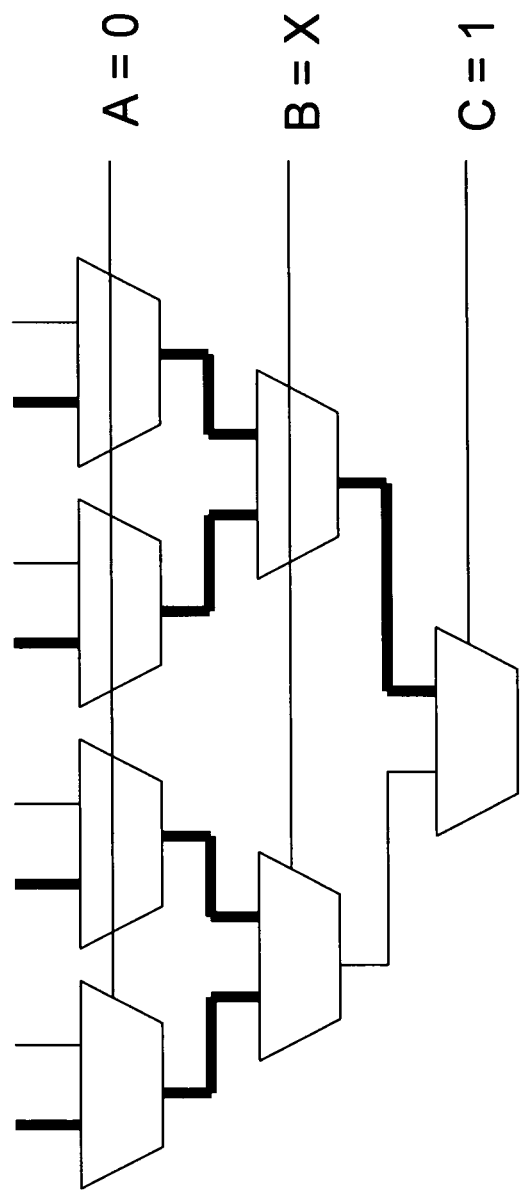
FIG. 10 illustrates a LUT-based logic function according to an embodiment of the present invention.

FIG. 10 illustrates a LUT-based logic function. As shown different inputs are set at the top of the logic cone to specify the functionality of the LUT. For an input state where A is 0 and input C is 1, and input B is potentially metastable, the relevant selected multiplexer inputs are highlighted. If the logic function is such that the output is not sensitive to input B, when A=0 and C=1, the two inputs being selected by the highlighted multiplexer will have equal values. Consequently, the logic output will not glitch regardless when B changes, assuming all other inputs are meeting timing. It should be appreciated that the improvement due to filtering can be dramatic for some designs. For example, for some streaming applications, once FIFOs receive data their empty flags may be insensitive to potentially metastable signals for long periods of time. Only when the FIFO is about to empty will the empty flag be sensitive.

FIGS. 2, 3, and 6-8 are flow charts illustrating methods according to embodiments of the present invention. Some of the techniques illustrated in these figures may be performed sequentially, in parallel, or in an order other than that which is described. It should be appreciated that not all of the techniques described are required to be performed, that additional techniques may be added, and that some of the illustrated techniques may be substituted with other techniques.

Figure 11:
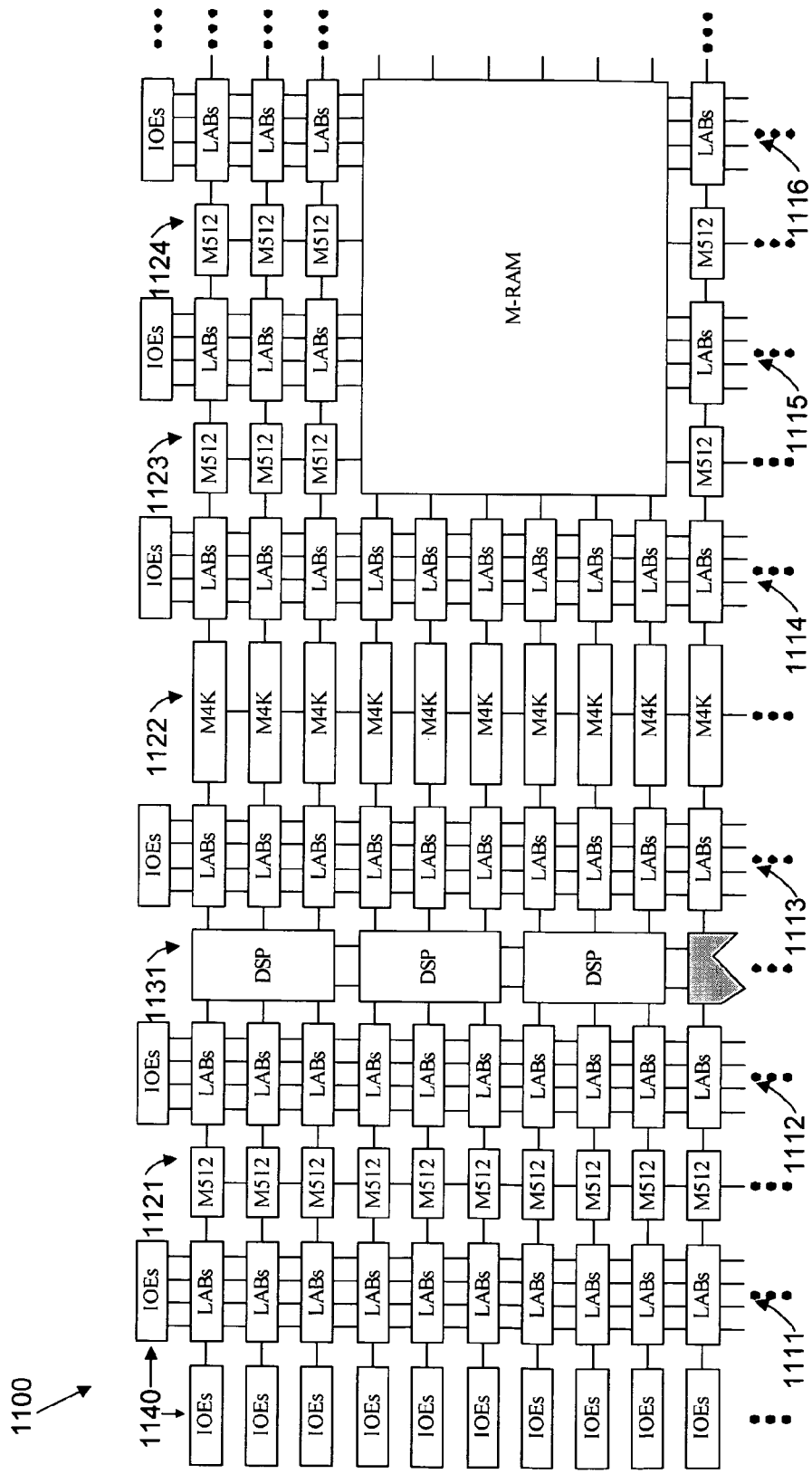
FIG. 11 illustrates a target device according to an embodiment of the present invention.

FIG. 11 illustrates a target device according to an embodiment of the present invention. The target device 1100 includes a plurality of logic-array blocks (LABs). Each LAB may be formed from a plurality of logic blocks, carry chains, LAB control signals, (lookup table) LUT chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input lookup table (LUT) with a configurable register. According to an alternate embodiment of the present invention, the logic block may operate similarly to an adaptive logic module (ALM), such as those found in Stratix devices manufactured by Altera Corporation. LABs are grouped into rows and columns across the target device 1100. Columns of LABs are shown as 1111-1116. It should be appreciated that the logic block may include additional or alternate components.

The target device 1100 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 1100. Columns of memory blocks are shown as 1121-1124.

The target device 1100 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the target device 1100 and are shown as 1131.

The target device 1100 includes a plurality of input/output elements (IOEs) 1140. Each IOE feeds an IO pin (not shown) on the target device 1100. The IOEs 1140 are located at the end of LAB rows and columns around the periphery of the target device 1100. Each IOE may include a bidirectional IO buffer and a plurality of registers for registering input, output, and output-enable signals.

The target device 1100 may include routing resources such as LAB local interconnect lines, row interconnect lines ("H-type wires"), and column interconnect lines ("V-type wires") (not shown) to route signals between components on the target device.

FIG. 11 illustrates an exemplary embodiment of a target device. It should also be appreciated that, as indicated above, the target device may include the same or different semiconductor devices arranged in a different manner. The target device 1100 may also include FPGA resources other than those described and illustrated with reference to the target device illustrated in FIG. 11. Thus, while embodiments of the invention described herein may be utilized on the architecture described in FIG. 11, it should be appreciated that it may also be utilized on different architectures.

Figure 12:
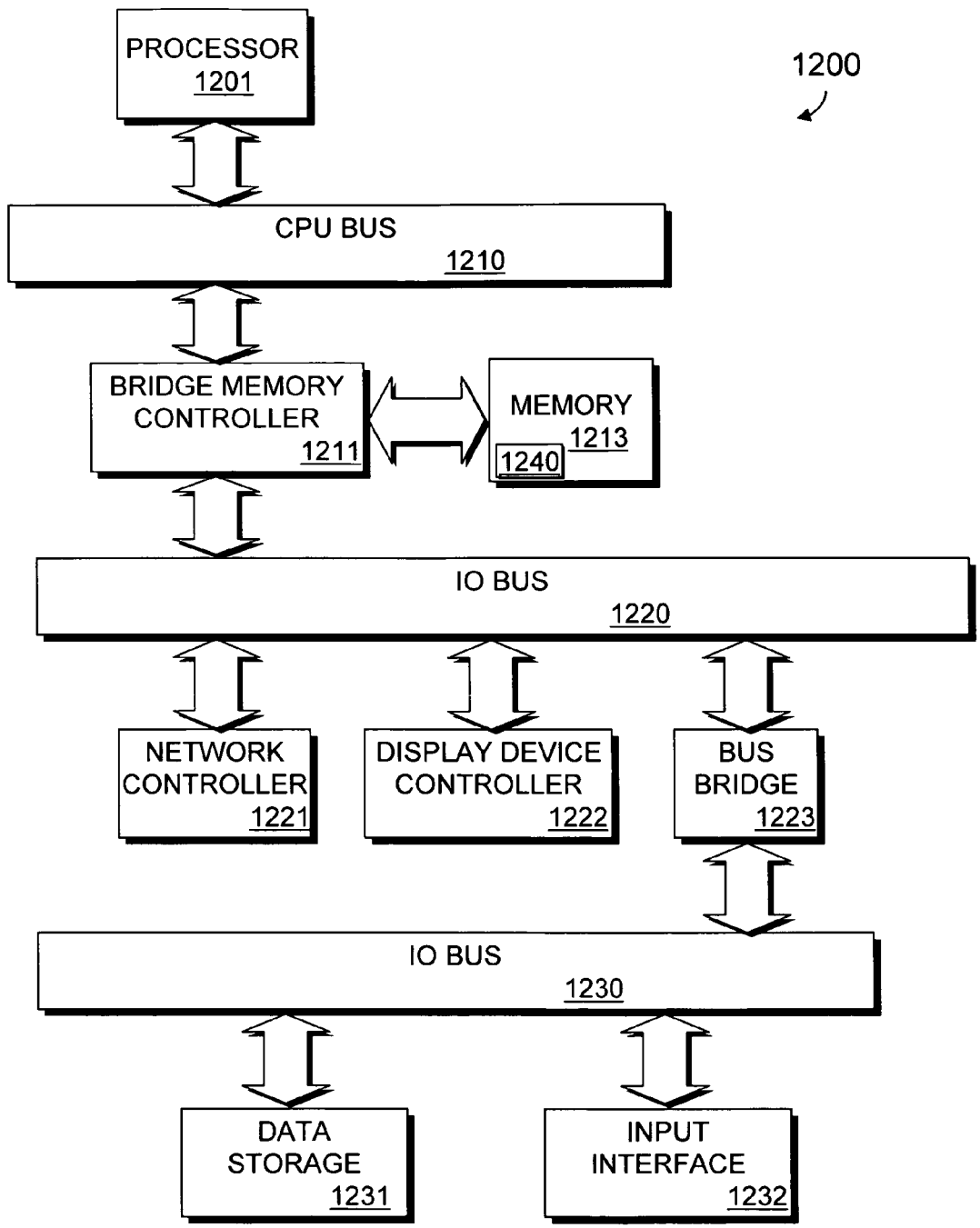
FIG. 12 illustrates a computer system on which a system designer resides according to an embodiment of the present invention.

FIG. 12 is a block diagram of an exemplary computer system 1200 in which an example embodiment of the present invention resides. The computer system 1200 includes a processor 1201 that processes data signals. The processor 1201 is coupled to a CPU bus 1210 or other switch fabric that transmits data signals to other components in the computer system 1200.

The computer system 1200 includes a memory 1213. The memory 1213 may store instructions and code represented by data signals that may be executed by the processor 1201. A bridge memory controller 1211 is coupled to the CPU bus 1210 and the memory 1213. The bridge memory controller 1211 directs data signals between the processor 1201, the memory 1213, and other components in the computer system 1200 and bridges the data signals between the CPU bus 1210, the memory 1213, and a first IO bus 1220. According to an embodiment of the present invention, the processor 1201 may be directly coupled to the memory 1213 and communicates with the memory 1213 without a bridge memory controller 1211.

The first IO bus 1220 may be a single bus or a combination of multiple buses. The first IO bus 1220 provides communication links between components in the computer system 1200. A network controller 1221 is coupled to the first IO bus 1220. The network controller 1221 may link the computer system 1200 to a network of computers (not shown) and supports communication among the machines. A display device controller 1222 is coupled to the first IO bus 1220. The display device controller 1222 allows coupling of a display device (not shown) to the computer system 1200 and acts as an interface between the display device and the computer system 1200.

A second IO bus 1230 may be a single bus or a combination of multiple buses. The second IO bus 1230 provides communication links between components in the computer system 1200. A data storage device 1231 is coupled to the second IO bus 1230. An input interface 1232 is coupled to the second IO bus 1230. The input interface 1232 allows coupling of an input device to the computer system 1200 and transmits data signals from an input device to the computer system 1200. A bus bridge 1223 couples the first IO bus 1220 to the second IO bus 1230. The bus bridge 1223 operates to buffer and bridge data signals between the first IO bus 1220 and the second IO bus 1230. It should be appreciated that computer systems having a different architecture may also be used to implement the computer system 1200.

A system designer 1240 may reside in memory 1213 and be executed by the processor 1201. The system designer 1240 may operate to synthesize a system, place the system on a target device, route the system on the target device, perform timing analysis, and assemble the system. The system designer 1240 may also operate to optimize and report a metric of reliability for the synchronizer chains in a design for the system.

FIG. 13 illustrates a system designer 1300 according to an embodiment of the present invention. The system designer 1300 may be an EDA tool and be used to implement the system designer 1240 illustrated in FIG. 12. FIG. 13 illustrates software modules implementing an embodiment of the present invention. According to one embodiment, system design may be performed by a computer system (not shown) executing sequences of instructions represented by the software modules shown in FIG. 13. Execution of the sequences of instructions causes the computer system to support system design as will be described hereafter. In alternate embodiments, hard-wired circuitry may be used in place of or in combination with software instructions to implement the present invention. Thus, the present invention is not limited to any specific combination of hardware circuitry and software. The system designer 1300 includes a system designer manager 1310. The system designer manager 1310 is coupled to and transmits information between components in the system designer 1300.

The system designer 1300 includes a synthesis unit 1320. The synthesis unit 1320 generates a logic design of a system to be implemented by a target device. According to an embodiment of the system designer 1300, the synthesis unit 1320 takes a conceptual Hardware Description Language (HDL) design definition and generates an optimized logical representation of the system. The optimized logical representation of the system generated by the synthesis unit 1320 may include a representation that has a minimized number of functional blocks and registers, such as logic gates and logic elements, required for the system. Alternatively, the optimized logical representation of the system generated by the synthesis unit 1320 may include a representation that has a reduced depth of logic and that generates a lower signal propagation delay. The synthesis unit 1320 also determines how to implement the functional blocks and registers in the optimized logic representation utilizing specific resources on a target device, thus creating an optimized post-synthesis netlist for each of the partitions in the system. The post-synthesis netlist indicate how the resources on the target device can be utilized to implement the system. The post-synthesis netlist may, for example, include components such as LEs on the target device.

The system designer 1300 includes a placement unit 1330. The placement unit 1330 fits the system on the target device by determining which resources on the target device are to be used for specific functional blocks and registers. According to an embodiment of the system designer 1300, the placement unit 1330 first determines how to implement portions of the optimized logic design in clusters. Clusters may represent a subset of the components on the target device such as, for example, a LAB having a plurality of logic blocks. In this embodiment, after portions of the optimized logic design are implemented in clusters, the clusters may be placed by assigning the clusters to specific LABs on the target device. Following the placement of the clusters, routing interconnections between the logic blocks may be performed. A cost function may be used to determine a good assignment of resources on the target device.

The system designer 1300 includes a routing unit 1340. The routing unit 1340 determines the routing resources on the target device to use to provide interconnection between the functional blocks and registers on the target device.

The system designer 1300 includes a synchronizer processor unit 1350. The synchronizer processor unit 1350 operates to identify, protect, and optimize synchronizer chains using the procedures described with reference to FIGS. 3-7 and report the quality of the synchronizer chains to a designer as described with reference to FIG. 8.

According to an embodiment of the system designer 1300, the system design manager 1310 performs an assembly procedure that creates a data file that includes the design of the system generated by the system designer 1300. The data file may be a bit stream that may be used to program the target device. The system design manager 1310 may output the data file so that the data file may be stored or alternatively transmitted to a separate machine used to program the target device. It should be appreciated that the system design manager 1310 may also output the design of the system in other forms such as on a display device or other medium.

Embodiments of the present invention may be provided as a computer program product, or software, that may include an article of manufacture on a machine accessible, machine/computer readable medium having instructions. The instructions on the machine accessible or machine/computer readable medium may be used to program a computer system or other electronic device. The medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium", or "computer readable medium" used herein shall include any medium that is capable of storing or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, the method comprising:
identifying destinations of asynchronous paths;
designating the destinations of the asynchronous paths identified as candidates for heads of synchronizer chains;
filtering the candidates for heads of synchronizer chains;
identifying synchronizer chains associated with remaining candidates for heads of synchronizer chains; and
protecting elements of the synchronizer chains that enable one of reliable synchronization and capture of a signal from a first timing domain to a second timing domain that is asynchronous with respect to the first timing domain by preventing register duplication during compilation, wherein one of the designating, filtering, protecting, and identifyings is performed by a processor.

2. The method of claim 1 further comprising propagating clock information through a timing graph to identify asynchronous transfers.

3. The method of claim 1 further comprising associating false path assignments and point-to-point delay assignments with the asynchronous paths.

4. The method of claim 1, wherein filtering the candidates for heads of synchronizer chains comprises eliminating a candidate that is at least one of fed by an enable signal and feeds logic fed by an enable signal, where the enable signal is generated from logic that is a function of another synchronizer chain.

5. The method of claim 1, wherein filtering the candidates for heads of synchronizer chains comprises eliminating a candidate that is determined to have a chain length of 1.

6. The method of claim 1, wherein filtering the candidates for heads of synchronizer chains comprises eliminating a candidate for heads of synchronizer chains based on a designer constraint that controls at least one of whether to protect, optimize, and report a synchronizer chain.

7. The method of claim 1, wherein identifying synchronizer chains associated with remaining candidates for heads of synchronizer chains comprises traversing forward from the remaining candidates for heads of synchronizer chains looking for storage elements that are reached by synchronous transfers.

8. The method of claim 1, wherein identifying synchronizer chains associated with remaining candidates for heads of synchronizer chains comprises finding chain elements based on a designer constraint that specifies a chain length to use for at least one of protection, optimization, and reporting.

9. The method of claim 1, wherein protecting the elements comprises disabling operations in a design for the system which can affect the robustness of synchronization by affecting a storage element driving a signal being synchronized.

10. The method of claim 1, wherein protecting the elements comprises prohibiting operations in a design for the system which reduce an effective depth of the synchronizer chains.

11. The method of claim 1, wherein protecting the elements comprises utilizing mean-time-between-failure (MTBF) estimates.

12. The method of claim 1, wherein protecting the elements comprises comparing mean-time-between-failure (MTBF)

estimates with a desirable MTBF computed as a function of a total number of anticipated synchronizers and a system MTBF target.

13. The method of claim 1 further comprising optimizing the synchronizer chains.

14. The method of claim 13, wherein optimizing the synchronizer chains comprises:
   identifying a desirable mean-time-between-failure (MTBF) for a synchronizer chain;
   computing a desirable chain slack for the synchronizer chain from the desirable MTBF for the synchronizer chain; and
   computing slacks on all the hops of the synchronizer chain based on a current slack and the desirable chain slack.

15. The method of claim 14, wherein identifying a desirable MTBF for a synchronizer chain comprises calculating a desirable MTBF for the synchronizer chain based on a number of anticipated synchronizers and a system MTBF target.

16. The method of claim 14, wherein computing slacks on all the hops of the synchronizer chain comprises mapping slack.

17. The method of claim 16, wherein mapping slack comprises annotating an actual chain slack minus a desired chain slack.

18. The method of claim 16, wherein mapping slack comprises dividing excess slack among various hops of the synchronizer chain, if the current slack for the synchronizer chain is greater than the desirable slack.

19. The method of claim 13, wherein optimizing the synchronizer chains comprises selecting back-bias settings to improve time constants of synchronization storage elements to achieve a desirable mean-time-between-failure (MTBF).

20. The method of claim 13, wherein optimizing the synchronizer chains comprises placing components of synchronizer chain in a small region and selecting routing resources to connect the components of the synchronizer chain to reduce the delay between the components of the synchronizer chain.

21. The method of claim 1 further comprising reporting a quality of the synchronizer chains to a user while designing the system on the target device.

22. The method of claim 21, wherein reporting the quality of the synchronizer chains comprises considering state-dependent filtering of metastability events based on logic after a synchronizer chain.

23. A non-transitory computer readable medium including a sequence of instructions stored thereon for causing a computer to execute a method comprising:
   identifying synchronizer chains in a system design; and
   protecting elements of the synchronizer chain that enable one of reliable synchronization and capture of a signal from a first timing domain to a second timing domain that is asynchronous with respect to the first timing domain by preventing register duplication during compilation.

24. The non-transitory computer readable medium of claim 23, wherein protecting the elements comprises disabling operations in a design for the system which can affect a robustness of synchronization by affecting a storage element driving a signal being synchronized.

25. The non-transitory computer readable medium of claim 23, wherein protecting the elements comprises prohibiting operations in a design for the system which reduce an effective depth of the synchronizer chains.

26. The non-transitory computer readable medium of claim 23, wherein protecting the elements comprises utilizing mean-time-between-failure (MTBF) estimates.

27. The non-transitory computer readable medium of claim 23, wherein protecting the elements comprises comparing mean-time-between-failure (MTBF) estimates with a desirable MTBF computed as a function of a total number of anticipated synchronizers and a system MTBF target.

28. A method for designing a system on a target device, the method comprising:
   identifying synchronizer chains in the system design; and
   reporting a quality of the synchronizer chains to a user, wherein the quality takes into consideration state-dependent filtering of metastability events based on logic within and logic after a synchronizer chain, and states of other inputs to the logic, wherein a data rate of the synchronizer chains affects the filtering, and wherein at least one of the identifying and reporting is performed by a processor.

29. The method of claim 28, wherein reporting the quality of the synchronizer chains comprises displaying a design mean-time-between-failure (MTBF) value that reflects failure rates of the synchronizer chains.

30. The method of claim 28, wherein reporting the quality of the synchronizer chains comprises displaying a mean-time-between-failure (MTBF) value for each of the synchronizer chains.

31. The method of claim 28, wherein reporting the quality of the synchronizer chains comprises considering time spent in master and slave latches of a storage element.

32. The method of claim 28, wherein the state-dependent filtering of metastability events comprises increasing filtering by synthesizing logic to be glitch-free.

33. A method for designing a system on a target device comprising:
   identifying synchronizer chains in a system design; and
   protecting elements of the synchronizer chain that enable one of reliable synchronization and capture of a signal from a first timing domain to a second timing domain that is asynchronous with respect to the first timing domain by preventing register duplication during compilation, wherein at least one of the identifying and protecting is performed by a processor.

34. The method of claim 33, wherein protecting the elements comprises disabling operations in a design for the system which can affect a robustness of synchronization by affecting a storage element driving a signal being synchronized.

35. The method of claim 33, wherein protecting the elements comprises prohibiting operations in a design for the system which reduce an effective depth of the synchronizer chains.

36. The method of claim 33, wherein protecting the elements comprises utilizing mean-time-between-failure (MTBF) estimates.

37. The method of claim 33, wherein protecting the elements comprises comparing mean-time-between-failure (MTBF) estimates with a desirable MTBF computed as a function of a total number of anticipated synchronizers and a system MTBF target.

* * * * *